March 18, 1924.

J. O. W. LAVALLEÉ

1,487,342

ELECTRIC GENERATING APPARATUS

Original Filed Oct. 31, 1921

INVENTOR
JOSEPH O. W. LAVALLEÉ
BY
Attorney

Patented Mar. 18, 1924.

1,487,342

UNITED STATES PATENT OFFICE.

JOSEPH O. W. LAVALLEÉ, OF MONTREAL, QUEBEC, CANADA, ASSIGNOR TO CARON BROTHERS INCORPORATED, OF MONTREAL, CANADA.

ELECTRIC GENERATING APPARATUS.

Original application filed October 31, 1921, Serial No. 511,893. Divided and this application filed December 26, 1922. Serial No. 609,088.

*To all whom it may concern:*

Be it known that I, JOSEPH O. W. LAVALLEÉ, a subject of the King of Great Britain and Ireland, residing at Montreal, Province of Quebec, Dominion of Canada, have invented new and useful Improvements in Electric Generating Apparatus, of which the following is a specification.

My invention relates to power plants and more particularly to small electric generator plants for domestic or farm use, and has for its object to provide electric current for lighting and other purposes by means of a simple and easily operated apparatus.

This application is filed as a division of an application for a patent for power plants, Serial No. 511,893, filed October 31st, 1921, by Joseph O. W. Lavalleé now pending. In that application a prime mover is disclosed with means of attaching thereto various operative mechanisms to be driven from the crank shaft of the prime mover.

Whereas this application relates to a prime mover with an attachable electric generator and switchboard.

In the usual form of generator plant now obtainable, the generator is coupled directly to the crank shaft, and the engine cannot function without operating the generator. By means of this invention a generator can be instantly coupled or uncoupled from the driving mechanism of the prime mover.

Furthermore the apparatus is so constructed that the prime mover can be purchased separately from the generator apparatus which is adapted to be sold in perfect adjustment to operate when attached by means of a simple character.

Reference is made to the annexed drawings in which—

Figure 1:
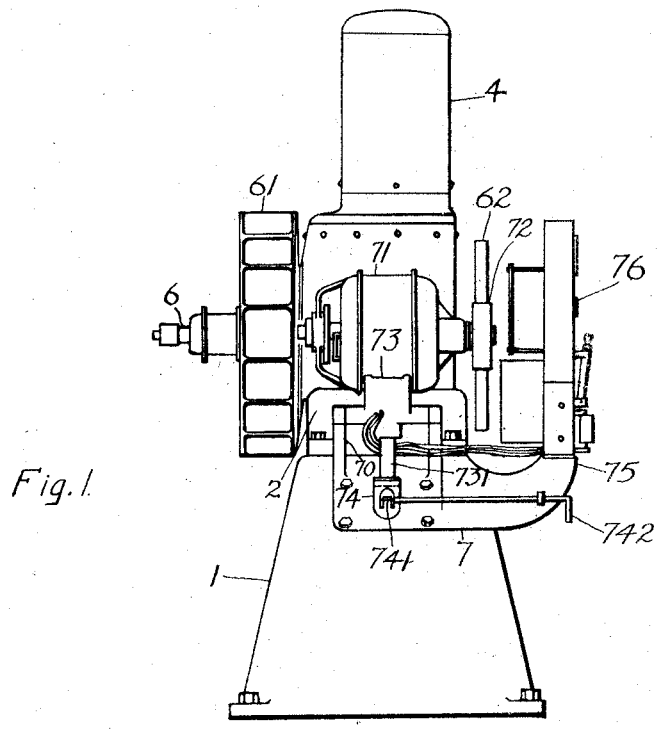
Figure 2:
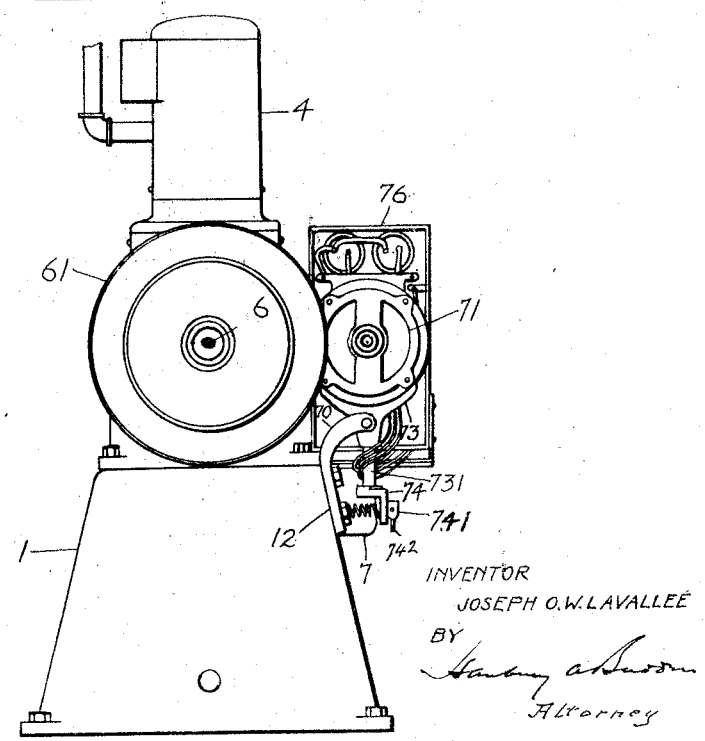

Figure 1 is a side view, and
Figure 2 is an end view.

The prime mover shown in the drawings is a gas engine supported on a base 1 with a bracket seat 12 on one side.

The base 1 may support a fuel tank 2 on which is mounted the crank case of the engine 4.

The crank shaft 6, journalled in the crank case is provided with a flywheel 61 and a friction pulley 62.

The bracket seat 12 has a bracket 7 bolted to it. A rocking crutch 73 is journalled in bearings on the bracket arms 70. An electric generator 71 is secured in the crutch 73 and has a friction wheel 72 keyed to its spindle.

The crutch 73 has a downward extension 731 connected to spring tension rocking mechanism 74.

A cam 741 operated by the rod 742 controls the rocking mechanism 74.

The bracket 7 has a sideways extension 75 on which is supported a switchboard 76, with the usual accessories and the generator is connected up therewith in the usual manner.

The rocking mechanism 74 when released by the cam 741 causes the generator to rock inwards bringing the friction wheel 72 in mesh with the pulley 62 and thereby rotating the generator spindle at the proper speed.

It will be evident that the bracket 7 supports a complete operative mechanism which is readily detachable as a unit. That this unit when the bracket 7 is attached to the bracket seat 12 is in complete operative adjustment with the prime mover.

By this means the necessity for expert or skilled labour in adjustment and management is obviated.

What I claim is:

1. In a power plant the combination of a prime mover, a rectangular base thereto, a bracket seat on the side of the base, with a bracket adapted to be attached to the bracket seat in accurate adjustment, an electric generator and a switch board supported on the bracket and means to couple the prime mover to the generator.

2. In a power plant the combination of a prime mover comprising an engine, a crank shaft, a driving pulley thereon and a base having a bracket seat on one side thereof, with a generator element comprising an electric generator a driven pulley mounted on the spindle thereof, a bracket adapted to fit the bracket seat in accurate adjustment, supporting the electric generator and means to cause the pulleys to mesh, an extension to the bracket and a switch board mounted thereon.

3. In a power plant a prime mover comprising an engine, a crank shaft, a pulley thereon, and a base, in combination with a generator element comprising an electric generator, a pulley on the spindle thereof, a bracket removably attached to the side of the engine base, a crutch journalled in the bracket, adapted to support the generator, and means to rock the crutch and cause the pulleys to mesh, a switchboard and an extension to the bracket supporting the switchboard.

4. In a power plant the combination of a central unit comprising an internal combustion engine, a crank shaft, a crank case, bearings for the crank shaft in the walls thereof a fuel tank, and a rectangular base, a flywheel on one end and a pulley on the other end of the shaft outside the bearings, with a bracket removably attached to one side of the base, a rocking crutch journalled in the bracket, an electric generator mounted on the crutch, a friction wheel keyed to the spindle of the generator, and a cam controlled tension device adapted to rock the crutch and cause the friction wheel to mesh with the pulley on the shaft, an extension to the bracket and a switchboard mounted thereon.

5. In a power plant the combination of a prime mover with an electric generator element, comprising a bracket attachable to a seat on the base of the prime mover, a rocking crutch journalled in the outward extensions of the bracket, an electric generator mounted on the crutch, a friction wheel keyed to the spindle of the generator, and a cam controlled tension device adapted to rock the crutch and cause the friction wheel to be coupled with the shaft of the prime mover, an extension to the bracket and a switchboard mounted thereon.

JOSEPH O. W. LAVALLEÉ.